(12) United States Patent
Ludvig et al.

(10) Patent No.: US 6,415,437 B1
(45) Date of Patent: Jul. 2, 2002

(54) METHOD AND APPARATUS FOR COMBINING VIDEO SEQUENCES WITH AN INTERACTIVE PROGRAM GUIDE

(75) Inventors: Ted Ludvig, Redwood City; Nathan Osborn, Menlo Park; Donald F. Gordon, Los Altos, all of CA (US)

(73) Assignee: DIVA Systems Corporation, Redwood City, CA (US)

(*) Notice: Subject to any disclaimer, the term of this patent is extended or adjusted under 35 U.S.C. 154(b) by 0 days.

(21) Appl. No.: 09/201,528

(22) Filed: Nov. 30, 1998

Related U.S. Application Data

(60) Provisional application No. 60/093,891, filed on Jul. 23, 1998.

(51) Int. Cl.[7] .............................................. H04N 5/445
(52) U.S. Cl. .............................. 725/41; 725/42; 725/54; 348/564
(58) Field of Search ................................. 345/326, 327; 455/6.2; 348/6, 10, 906, 563–568, 569, 553; 725/41, 42, 54, 43, 44; H04N 7/16, 5/445

(56) References Cited

U.S. PATENT DOCUMENTS

| | | | | |
|---|---|---|---|---|
| 5,422,674 A | * | 6/1995 | Hooper et al. | 348/6 X |
| 5,473,609 A | * | 12/1995 | Chaney | 348/906 X |
| 5,515,106 A | * | 5/1996 | Chaney et al. | 348/906 X |
| 5,625,405 A | | 4/1997 | DuLac et al. | 348/7 |
| 5,633,810 A | | 5/1997 | Mandal et al. | 364/514 C |
| 5,652,614 A | | 7/1997 | Okabayashi | 348/7 |
| 5,724,543 A | | 3/1998 | Ozden et al. | 395/441 |
| 5,732,217 A | | 3/1998 | Emura | 395/200.49 |
| 5,745,710 A | | 4/1998 | Clanton, III et al. | 395/327 |
| 5,768,551 A | | 6/1998 | Bleiweiss et al. | 395/311 |
| 5,801,753 A | * | 9/1998 | Eyer et al. | 348/906 X |
| 5,812,754 A | | 9/1998 | Lui et al. | 395/182.04 |
| 5,818,439 A | | 10/1998 | Nagasaka et al. | 345/327 |
| 5,826,110 A | | 10/1998 | Ozden et al. | 395/865 |
| 5,917,830 A | | 6/1999 | Chen et al. | 370/487 |
| 6,005,562 A | * | 12/1999 | Shiga et al. | 345/327 |
| 6,147,714 A | * | 11/2000 | Tersawa et al. | 348/564 |

FOREIGN PATENT DOCUMENTS

| | | | |
|---|---|---|---|
| EP | 0 721 253 A2 | 7/1996 | H03J/1/04 |
| WO | WO 94 14282 A | 6/1994 | H04N/7/16 |

\* cited by examiner

*Primary Examiner*—Chris Grant
(74) *Attorney, Agent, or Firm*—Moser, Patterson & Sheridan LLP

(57) ABSTRACT

A method and apparatus for combining video frame sequences with a video display of an interactive program guide (IPG). The apparatus comprises a plurality of compositors that combine background information, video frame sequences and program guide graphics into a single video frame sequence. The sequence is then digitally encoded to form an MPEG-like bitstream. The same background information and video advertising is composited with a different program guide graphic to form another video sequence that is also encoded. A plurality of such sequences are produced with each sequence having a different program guide graphic. Each sequence is encoded and then multiplexed into a transport stream such that all the encoded sequences are transmitted to a subscriber's terminal using a single transport stream. As such, the subscriber can scroll from one program guide to the next without interruption of the background or video display as the program guide graphic is changed. Each graphic contains a set of programs (e.g., channels) listed along a left, vertical axis and each program associated with the channel is identified in a rectangular cell that extends toward the right. The horizontal axis represents time and about 2 hours of programming for ten channels is shown in the graphic.

18 Claims, 4 Drawing Sheets

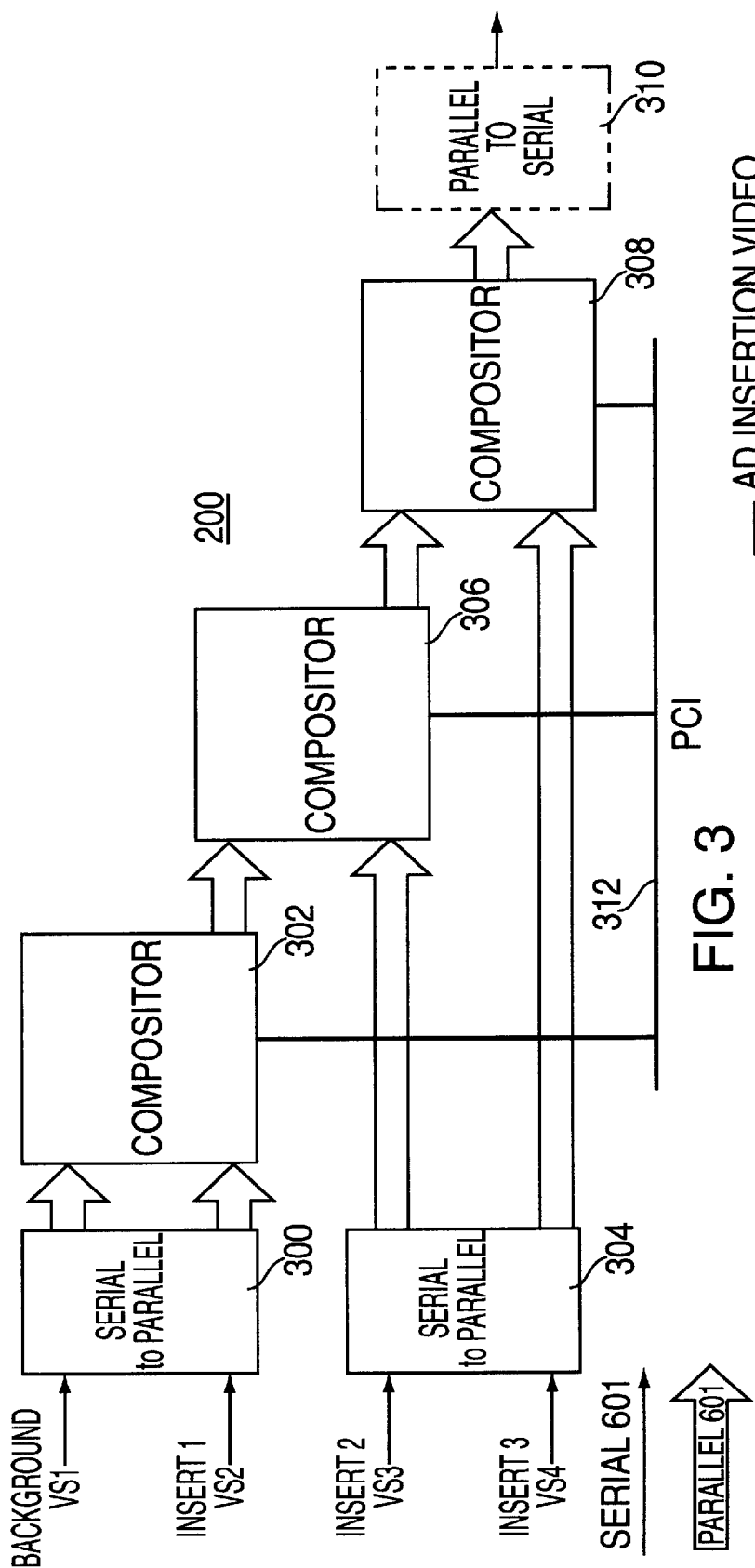
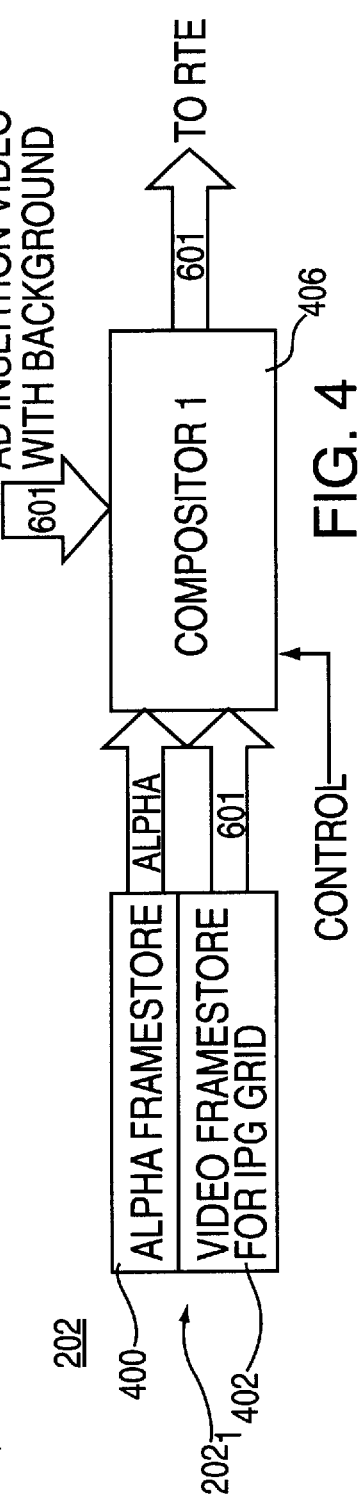
FIG. 3
FIG. 4

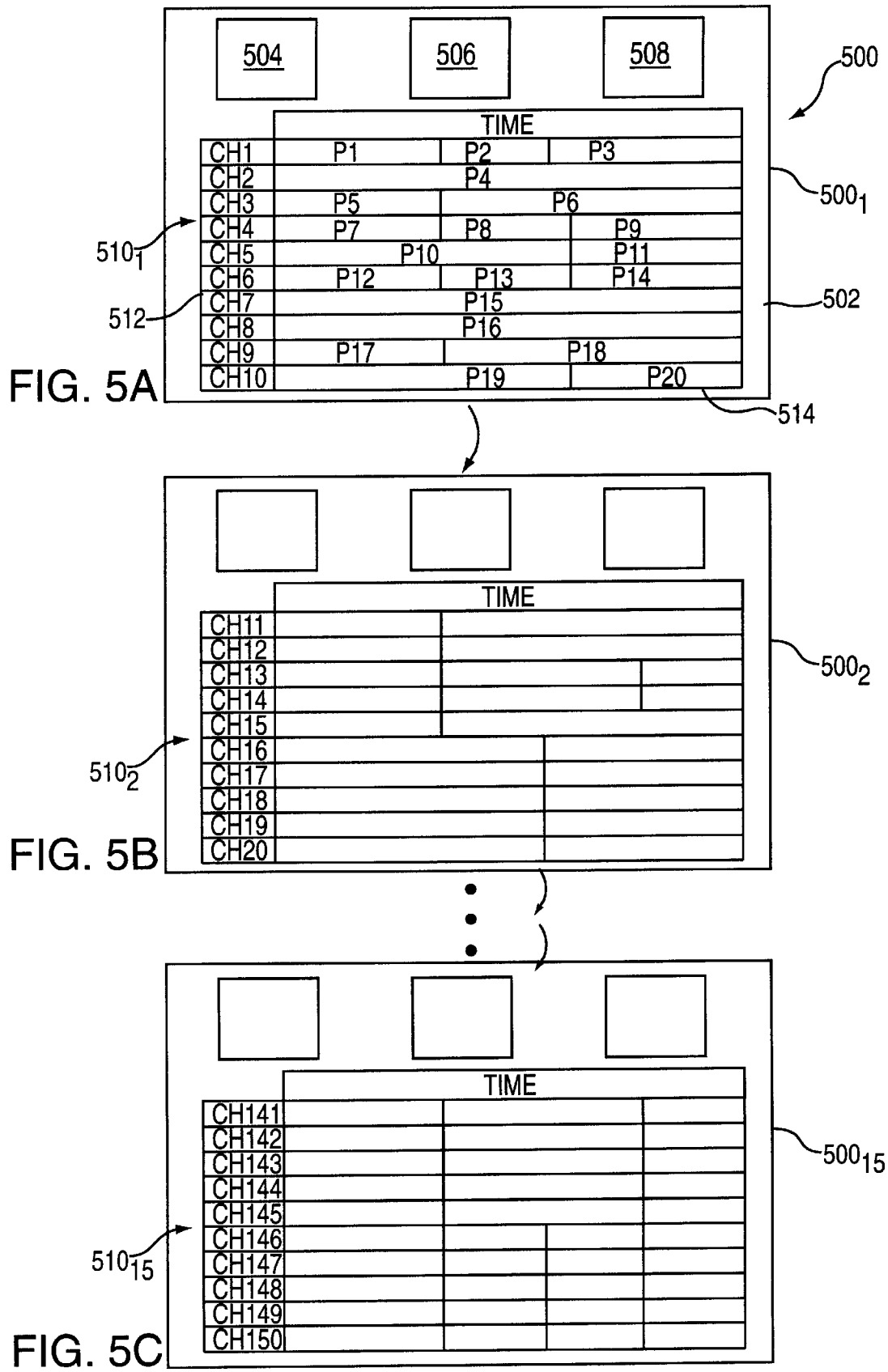

METHOD AND APPARATUS FOR COMBINING VIDEO SEQUENCES WITH AN INTERACTIVE PROGRAM GUIDE

CROSS REFERENCE TO RELATED APPLICATIONS

This application claims benefit of U.S. provisional patent application Ser. No. 60/093,891 filed Jul. 23, 1998 which is hereby incorporated herein by reference.

BACKGROUND OF THE DISCLOSURE

1. Field of the Invention

The invention relates to electronic program guides and, more particularly, the invention relates to combining video sequences with an interactive program guide.

2. Description of the Background Art

In several communications systems, the data to be transmitted is compressed so that the available transmission bandwidth is used more efficiently. For example, the Moving Pictures Experts Group (MPEG) has promulgated several standards relating to digital data delivery systems. The first, known as MPEG-1 refers to ISO/IEC standards 11172 and is incorporated herein by reference. The second, known as MPEG-2, refers to ISO/IEC standards 13818 and is also incorporated herein by reference. A compressed digital video system is described in the Advanced Television Systems Committee (ATSC) digital television standard document A/53, and is incorporated herein by reference.

The above-referenced standards describe data processing and manipulation techniques that are well suited to the compression and delivery of video, audio and other information using fixed or variable length digital communications systems. In particular, the above-referenced standards, and other "MPEG-like" standards and techniques, compress, illustratively, video information using intra-frame coding techniques (such as run-length coding, Huffman coding and the like) and inter-frame coding techniques (such as forward and backward predictive coding, motion compensation and the like). Specifically, in the case of video processing systems, MPEG and MPEG-like video processing systems are characterized by prediction-based compression encoding of video frames with or without intra- and/or inter-frame motion compensation encoding.

Over the past few years, television has seen a transformation in the variety of means by which its programming is distributed to consumers. Cable television systems are doubling or even tripling system bandwidth with the migration to hybrid fiber coax (HFC) cable plant thereby offering a larger number of channels to the viewer. Customers unsatisfied with their local cable systems have switched in high numbers to direct broadcast satellite (DBS) systems. And, a variety of other approaches have been attempted focusing primarily on high bandwidth digital technologies, intelligent two way set top boxes, or other methods of trying to offer service differentiated from standard cable and over the air broadcast systems.

With this increase in bandwidth, the number of programming choices has also increased. Leveraging off the availability of more intelligent set top boxes, several companies such as Starsight and Prevue Guide have developed elaborate systems for providing an interactive listing of the vast array of channel offerings, expanded textual information about individual programs, the ability to look forward to plan television viewing as much as several weeks in advance, and the option of automatically programming a VCR to record a future broadcast of a television program.

Unfortunately, the existing program guides have several drawbacks. They tend to require a lot of memory, some of them needing upwards of one megabyte of set top terminal memory. They are very slow to acquire their current database when they are activated for the first time or are subsequently restarted (e.g., a large database may be downloaded to a set top terminal using only a vertical blanking interval (VBI) data insertion technique). Disadvantageously, such slow database acquisition may result in out of date database information or, in the case of a pay per view (PPV) or video-on-demand (VOD) system, limited scheduling flexibility for the information provider. The user interface to existing program guides does not usually look like a typical television control interface; rather the user interface looks like a 1980s style computer display (i.e., blocky, ill-formed text and/or graphics).

Additionally, the present program guides may provide an advertising or preview region along with the program guide graphics. However, the insertion of these additional video signals is performed using an analog compositor that merely inserts (overlays) the additional imagery into the broadcast stream. The analog compositing. process is accomplished and then the new analog video containing an advertisement or preview and the program guide are recorded on tape for subsequent broadcast. This compositing process is not accomplished in real time at the head end of the cable system and, consequently, the program guide can not contain targeted advertising for a particular household or a particular neighborhood or region. The program guide with its associated preview or advertising is broadcast to all subscribers connected to the head end of the cable system. Additionally, these program guides are generally passive, in that, the viewer sees the program guide information change on the screen to indicate different programs and their associated channels. However, there is no provision enabling a viewer to interact with the program guide display to scroll through the channel or channels that are available. Because such scrolling in an analog system requires a splice to a new program guide video sequence, the program guides that are interactive do not include advertising video or other video information with the program guide.

Therefore, it is desirable to provide a method and apparatus for combining advertising or other video sequences with an interactive program guide such that a viewer can scroll through the available programming while being shown uninterrupted video sequences.

SUMMARY OF THE INVENTION

The disadvantages associated with the prior art are overcome by the present invention of a method and apparatus for combining video (such as advertising) with an interactive program guide (IPG) to form an IPG screen that contains a region playing a video sequence. The invention comprises a plurality of compositors that combine background information, advertising video and program guide graphics into a single sequence of video frames. The sequence is then digitally encoded to form an MPEG-like bitstream. The same background information and advertising video is composited with a different program guide graphic to form another video sequence that is also encoded. A plurality of such bitstreams are produced with each sequence containing a different program guide graphic. The encoded sequences are then multiplexed into a transport stream such that all the encoded sequences are transmitted to subscriber equipment using a single transport stream. As such, the subscriber can scroll from one program guide page to the next without interruption of the background or advertising video as the program guide page graphic is changed. Each graphic contains a set of programs (e.g., channels) listed along a left, vertical axis and each program associated with the channel is identified in a rectangular cell that extends toward the right. The horizontal axis represents time and about 2 hours of programming for ten channels is shown in each program guide graphic page. The advertising video is generally contained in one or more rectangular regions above the program graphic.

BRIEF DESCRIPTION OF THE DRAWINGS

The teachings of the present invention can be readily understood by considering the following detailed description in conjunction with the accompanying drawings, in which:

FIG. 3 depicts a block diagram of an AD compositor that produces background/advertisement frame sequence in accordance with the present invention;

FIG. 4 depicts a block diagram of an IPG compositor that inserts an IPG graphic into the background/advertisement frame sequence; and FIGS. 5A–5C depicts a series of illustrative IPG screens.

To facilitate understanding, identical reference numerals have been used, where possible, to designate identical elements that are common to the figures.

DETAILED DESCRIPTION

Figure 1:
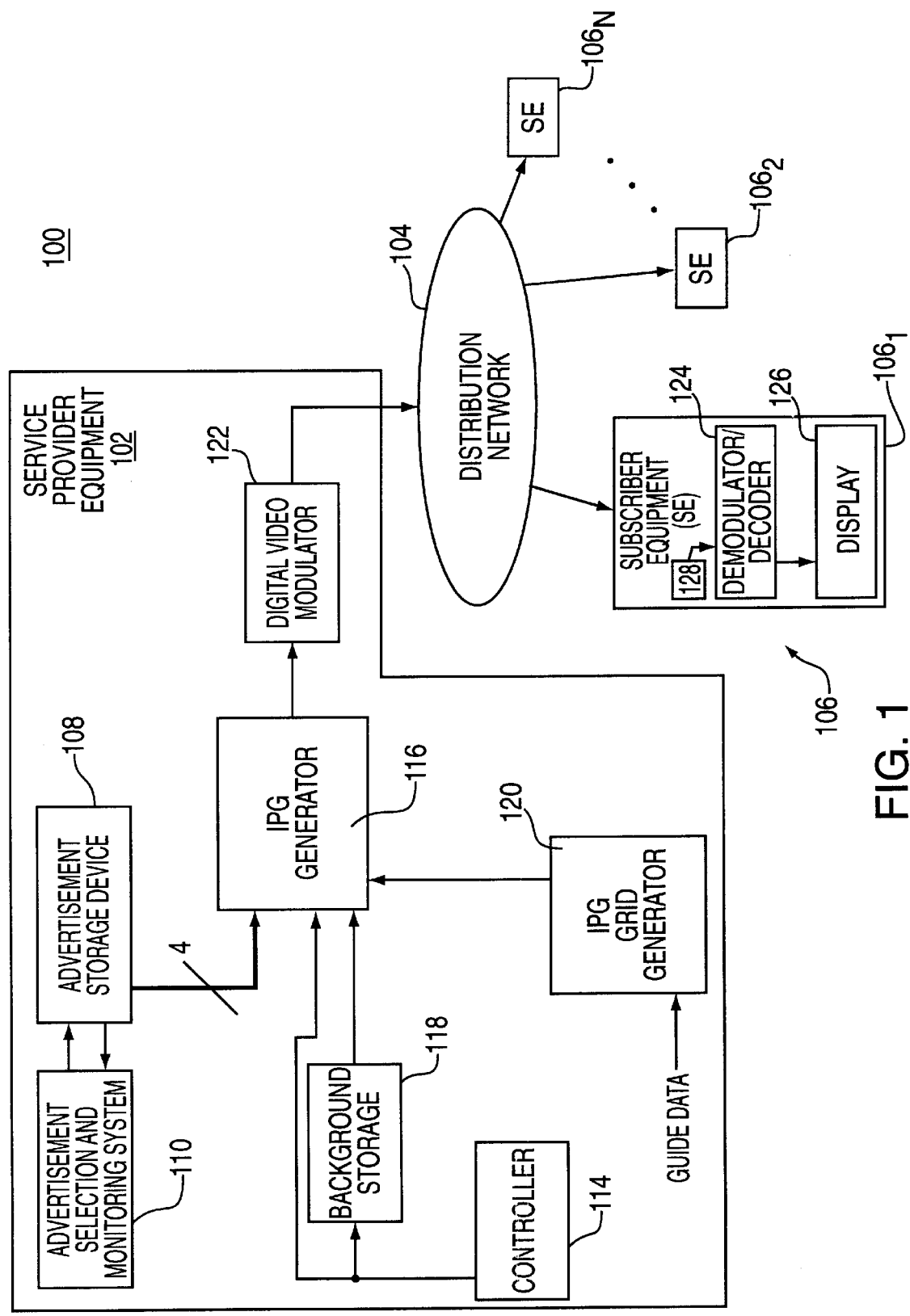
FIG. 1 depicts a high-level block diagram of an information distribution system that uses the interactive program guide of the present invention.

FIG. 1 depicts a high-level block diagram of an information distribution system 100, e.g., a video-on-demand system or digital cable system, which incorporates the present invention. The system 100 contains service provider equipment (SPE) 102 (e.g., a head end), a distribution network 104 (e.g., hybrid fiber-coax network) and subscriber equipment (SE) 106. This form of information distribution system is disclosed in commonly assigned U.S. Pat. No. 6,253,375. The system is known as the OnSet™ system provided by DIVA Systems Corporation of Menlo Park, Calif.

In general, the SPE 102 produces a plurality of digital bitstreams that contain encoded information (e.g., television programming in an MPEG-like compressed form). These bitstreams are modulated using a modulation format that is compatible with the distribution network 104. The subscriber equipment 106, at each subscriber location $106_1$, $106_2$, ..., $106_n$, comprises a decoder 124 and a display 126. Upon receiving a bitstream, the subscriber equipment decoder 124 extracts the information from the received signal and decodes the stream to produce the information on the display, i.e., produce a television program.

In an interactive information distribution system such as the one described in commonly assigned U.S. Pat. No. 6,253,375, the program bitstreams are addressed to particular subscriber equipment locations that requested the information through an interactive menu. An appropriate interactive menu structure is disclosed in commonly assigned U.S. Pat. No. 6,208,335.

To assist a subscriber (or other viewer) in selecting programming, the SPE 102 produces a interactive program guide (IPG) in accordance with the present invention. The IPG of the present invention contains program information, e.g., title, time, channel, program duration and the like, as well at least one region displaying full motion video, i.e., a television advertisement. Advertisements are provided in various locations within the program guide screen. FIG. 5A illustrates an IPG 500 that is produced in accordance with the present invention. The IPG 500 contains a background 502, a plurality of video display regions 504, 506, and 508, and a program guide graphic 510. The program guide graphic 510 contains a left (or right), vertical axis 512 representing the available channels and a bottom (or top), horizontal axis 514 represents time. Generally, about 1.5 to 2 hours of programming are displayed in the guide graphic 510. Each program (e.g., P1, P2, P3, and so on) is identified by a program title within a rectangular cell. The extent of the cell (its length) indicates the duration of the program and the starting location of the left edge of the cell indicates the starting time of the program. The arrangement of the program identification cells in this manner is a conventional arrangement in which programming guides have been organized in print for years.

Returning to FIG. 1, the invention produces the IPG (500 of FIG. 5A) using a novel compositing technique that enables full motion video to be positioned within an IPG and have the video seamlessly transition from one IPG page to another. FIG. 1 depicts the components that are necessary to produce an IPG page that contains at least one video region. The embodiment of the invention is described as having advertising displayed in the video region or regions. However, advertising is merely illustrative and any sequence of video or graphic information can be displayed in these regions. To this end, the SPE 102 contains an advertisement storage device 108, an advertisement selection and monitoring system 110, an IPG generator 116, a background storage device 118, a controller 114, an IPG grid generator 120, and a digital video modulator 122. The advertisement selection and monitoring system 110 controls timing of advertisement display and tracks advertisement utilization to facilitate billing to the advertiser whenever a particular advertisement is transmitted. Thus, the advertisement selection and monitoring system 110 requests that the advertising storage device 108 (e.g., a disk drive or magneto-optical drive) recall and send to the IPG generator 116 a particular advertisement or advertisements. The advertisements are stored in the storage device 108 as frame-based digital video (i.e., 601 format video) and associated audio. Alternatively, compressed or uncompressed analog video as well as other formats of video information may be stored in the storage device 108. These formats are converted to 601 format prior to sending the video to the IPG generator 116.

As the advertising video is recalled from device 108, each advertisement is coupled to the IPG generator 116. As such, three video streams and one audio stream (e.g., an audio stream associated with one of the advertisements) are provided to the IPG generator 116. Additionally, a background image is recalled from the storage device 118 under instructions from the controller 114. The background image is generally a static graphic, but it may be a video frame sequence containing moving imagery. Lastly, the IPG grid generator 120 provides a program guide graphic to the IPG generator 116. The IPG data for the graphic can be provided from any one of a number of sources such as a network cable feed, an internet site, a satellite feed, and the like. The guide program data is formatted into the rectangular grid graphic of program cells (screen 500 of FIG. 5A) by the IPG grid generator 120.

The IPG generator 116 combines the three advertisements, the background and the guide graphics into a comprehensive IPG display such as the one depicted as IPG page 500 in FIG. 5A. As shall be described in detail below, the advertisement video is overlaid onto the background to form a background/advertisement composite and then various IPG grids are overlaid atop the background/advertisement composite. In this manner, a number of IPG "pages", for example, fifteen of them, are produced, where each page depicts ten channels of programming information. Each of these IPG pages is encoded within the IPG generator 116 into a compressed digital bitstream, e.g., an MPEG compliant bitstream. The bitstream is then modulated by the digital video modulator 122 using a modulation format that is compatible with the distribution network 104. For example, in the OnSet™ system the modulation is quadrature amplitude modulation (QAM); however, other modulation formats could be used.

The subscriber equipment 106 contains a decoder 124 and a display 126 (e.g., a television). The demodulator/decoder 124 demodulates the signals carried by the distribution network 104 and decodes the demodulated signals to extract the IPG pages from the bitstream. As shall be described below, each of the IPG pages is identified with a unique program identification code (known as a PID) that is used by the demodulator/decoder 124 to select a bitstream for decoding. The decoded IPG page is displayed, as shown in FIG. 5A, to the subscriber or viewer. As the viewer selects another IPG page containing other program information, generally by scrolling to the bottom of the IPG graphic 510 using a remote control interface 128 or some other input device, the IPG page stream associated with the next PID is decoded. The only change the viewer sees is the IPG graphic changes (from, for example, graphic $510_1$ to $510_2$), the advertising video and its associated audio seamlessly continues playing. This seamless play occurs because each of the IPG pages contains the same, frame synchronized background and advertising and only the IPG graphic changes from page to page. As such, the decoder seamlessly transitions from one IPG page to another.

Figure 2:
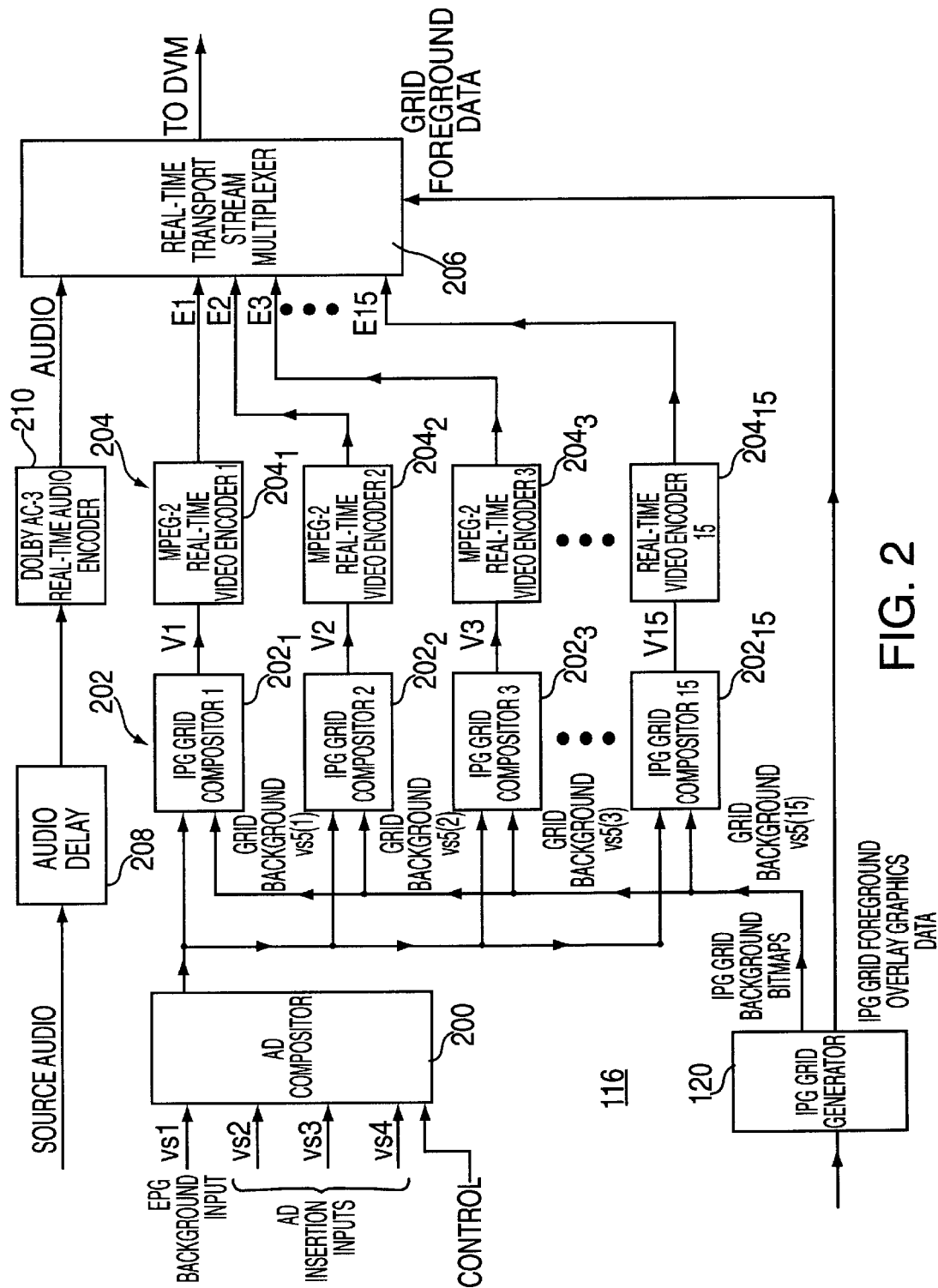
FIG. 2 depicts a block diagram of an IPG generator of the present invention.

FIG. 2 depicts a block diagram of the IPG generator 116. The IPG generator 116 contains an AD compositor 200, a plurality of IPG grid compositors 202, a plurality of video encoders 204 (e.g., MPEG-2 compliant encoders), a transport stream multiplexer 206, an audio delay 208, an audio encoder 210 (e.g., an Dolby AC-3 audio encoder) and the IPG grid generator 120. The AD compositor 200 positions the advertisement video sequences (vs2, vs3, vs4) upon the background video imagery (vs1). To facilitate positioning, the controller (114 in FIG. 1) provides the AD compositor 200 with the coordinates of one corner of each advertising video and provides a size indicator for each rectangular region in which the video will be displayed relative to the background. The compositor 200 performs the placement and fusing of the imagery to form background/advertisement video frame sequence. Further detail of this compositing process is provided below with respect to FIG. 3.

The composite image (e.g., three, full motion video frame sequences positioned upon a background image, the background/advertisement video) is coupled to a plurality of IPG grid compositors $202_1$, $202_2$, $202_3$, . . . , $202_{15}$ (collectively referred to as compositors 202). The compositors 202 combine the respective IPG graphics with the background/advertisement video to produce a plurality of video frame sequences containing a composite of the background, the advertising video, and the IPG graphics. There is one frame sequence for each IPG graphic, e.g., fifteen sequences in all. As discussed previously, the IPG graphic is produced by the IPG grid generator 120. The IPG grid generator 120 actually produces two items, one is the IPG grid background image (the IPG grid graphic discussed above and shown as graphic 510 in FIG. 5A), and IPG grid foreground overlay graphic data that is used to generate highlighting and other special effects in the displayed IPG screen. Additionally, this data attributes functionality to the highlighted elements such as selecting another IPG page, selecting a program to view, exiting the system, and the like. These special effects and functionality are discussed below with respect to FIGS. 5A, 5B and 5C.

Each of the frame sequences (IPG screen sequences V1, V2, V3, . . . , V15) are coupled from the compositors 202 to the plurality of video encoders, e.g., real time MPEG-2 encoders $204_1$, $204_2$, $204_3$, . . . $204_n$ (collectively encoders 204). Each encoder 204 encodes an IPG screen sequence to form a compressed video bitstream, e.g., an MPEG-2 compliant bitstream.

All the compressed video streams (E1, E2, E3, . . . , E15) containing program guide information are multiplexed into a transport stream using multiplexer 206. In addition to the video information, audio information associated with one of the advertising videos is also encoded and supplied to the multiplexer 206. The audio signal is delayed in audio delay 208, then encoded in the audio encoder 210. The delay compensates for the time required to perform video encoding of the associated video vis-a-vis the audio encoding. The compressed audio data is coupled to the multiplexer 206 for incorporation into the transport stream.

A transport stream, as defined in ISO standard 13818-1 (commonly known as the MPEG-2 Systems specification), is a sequence of equal sized packets, each 188 bytes in length. Each packet has a 4-byte header and 184 bytes of data. The header contains a number of fields, of which the one of concern at the moment is the "packet identifier" or "program identifier" (known as a PID). The PID field contains 13 bits and uniquely identifies each packet that contains a portion of a "stream" of video information as well as audio information and data. As such, to decode a particular video bitstream (or audio bitstream or data) for viewing, the decoder in the subscriber equipment extracts packets containing a particular PID and decodes those packets to create the video (and audio) for viewing.

Each of the fifteen bitstreams representing the IPG page sequences are uniquely identified by a PID. In the preferred embodiment of the PIDs and fifteen bitstreams are multiplexed into a single transport stream. Of course, less of more IPG bitstreams can be included into the transport stream as bandwidth permits. Additionally, more than one transport stream can be used to transmit the IPG bitstreams.

The IPG grid foreground overlay graphics data is also coupled to the multiplexer 206 from the IPG grid generator 120. This graphics data is generally sent as "user data" or "private data" within the transport stream. Further discussion of the graphics data is provided below.

Returning to FIG. 1, the transport stream is coupled to a digital video modulator 126 where it is modulated onto a carrier that is appropriate for transmission through the distribution network 104. For a hybrid fiber coax based distribution network 104, the modulation is quadrature amplitude modulation (QAM).

The subscriber terminals 106 are connected to the network 104 and receive the transport stream from the network 104. A demodulator/decoder 124 in each of the terminals extracts the transport stream from the modulation, demultiplexes the bitstreams within the transport stream, and decodes a selected program guide video sequence. Since all the program guide bitstreams are contained in the transport stream, the terminal selects a particular program guide using a unique packet identifier (PID) that causes a video demodulator/decoder 124 to decode the program guide bitstream identified by that PID. When the user selects another program guide, another stream is decoded based upon the newly selected PID. By transmitting the program guide streams in a common transport stream and by frame locking the program guide source and video, the latency experienced as a subscriber selects one guide page after another is nearly undetectable. Also, because the advertising is the same and frame synchronized in each program guide bitstream with the only difference being a different guide graphic, the subscriber sees a transition in the guide graphic, but the advertisement audio and video is seamlessly presented to the viewer.

FIG. 3 depicts a detailed block diagram of the AD compositor 200. The compositor 200 contains a plurality of serial-to-parallel converter modules 300 and 304, a plurality of image compositors 302, 306, and 308, an optional parallel-to-serial converter module 310 and a PCI bus 312. The advertising video signals vs2, vs3, vs4 are assumed to be supplied as a conventional pixilated video signal in a 601 format (digital video) having each frame of 601 video synchronized with the frames of the other advertisement video signals. Generally, 601 video is supplied as a serial bitstream that is converted into parallel stream, i.e., one complete video frame is coupled to the compositor at a time.

More specifically, the background imagery vs1 and the first advertisement video vs2 are coupled to the serial-to-parallel converter module 300. The frames of each of these video signal are then coupled to the compositor 302. In operation, the compositor 302 synchronizes the frames, resizes the advertising video to fit into a predefined rectangular region, positions the rectangular region on the background and merges the two video frame sequences. The controller 114 of FIG. 1 uses the PCI bus 312 to instruct the compositor as to the size of the advertising video region and its position on the background. A commercially available compositor that performs the foregoing operations using 601 video signals is available as model Genie manufactured by Pinnacle Systems of Mountain View, Calif.

The composited video sequence containing the background and first advertising video is then coupled to the second compositor 306 such that the second advertising video is composited onto the background and first video. The third compositor 308 performs a similar function to produce a frame sequence having the background and three advertising video sequences composited into a single sequence. The size and position of the advertising video display regions is controlled by signals from the controller via the PCI bus 312. The output sequence from the third compositor 308 is optionally coupled to the parallel-to-serial converter module 310 to produce a serial bitstream. Generally, the parallel data is coupled directly to the IPG grid compositors (202 in FIG. 2); however, if the AD compositor 200 is not physically near the compositors 202, then the parallel-to-serial convertor 310 may be used to improve the integrity of the data as it is communicated over a distance. Although only three advertising videos were added to the background using three compositors, clearly more compositors can be used if additional advertising video sequences are desired.

FIG. 4 depicts a block diagram of one of the IPG grid compositors 202, e.g., compositor $202_1$. The compositor $202_1$ contains an alpha framestore 400, a video framestore 402 and a compositor 406. The alpha framestore 402 stores a bitmap array of weighting functions that control the degree of transparency that the IPG grid will have with respect to the background/advertising frame sequence, i.e., the bitmap contains a value of transparency for each and every pixel in the IPG graphic. As such, the alpha framestore information controls the amount of background/advertising video scene that can be viewed "through" the IPG graphic. The video frame store 402 buffers the IPG graphic on a frame-by-frame basis to ensure alignment with the background/advertising video frames. The compositor 406 combines the IPG graphic with the background/advertising frames produced by the AD compositor 200 in FIG. 2. The position and size of the IPG graphic with respect to the background is controlled, via the control signal coupled to the compositor 406, by the controller 114 of FIG. 1.

Each of the IPG graphics, e.g., fifteen, are separately composited in this manner with the background and the advertising. As such, fifteen separate bitstreams, one contains each IPG graphic, are encoded and arranged in the transport stream.

FIG. 5A depicts an illustrative IPG screen $500_1$ as decoded by the decoder of the subscriber equipment. The screen $500_1$ is one of the fifteen available screens (collectively referred to as IPG screens 500) that can be decoded by appropriate selection of a screens PID. As decoded, the advertising video in regions 504, 506 and 508 plays as any decoded video streams. The audio signal associated with one of the advertising video sequences also is decoded and plays in conjunction with the video (i.e., audio follows video). The first IPG graphic 510 contains, for example, program information concerning channels 1 through 10. The subscriber, by manipulating an input device, can scroll through the program selections. As the scrolling function transitions from one cell to another, the cell is highlighted by a change in the on-screen display graphics. These graphics are sent to the subscriber equipment as "user data" and/or "private data" within the transport stream.

When the subscriber reaches the bottom of the IPG graphic, i.e., the last cell or a special icon (arrow), a different PID is selected for decoding, i.e., the PID for the next IPG page containing channels 11 through 20. The decoder begins decoding the next stream as soon as it is selected. The connection between IPG pages is a functional attribute that is generally transmitted to the subscriber equipment as user data within the transport stream. Since the background and the video advertising were synchronously added to the video sequence that become the IPG pages, the advertising seamlessly transitions from one screen to another without any visible anomalies. The IPG graphic is the only portion that changes from $510_1$ to $510_2$. The process of transitioning from one IPG page to another can be accomplished by incrementing or decrementing through the IPG pages. Additionally, parallel pages may be available to display additional time slots. As such, IPG pages representing programming in other time periods could be accessed by, for example, left and right arrows.

Although various embodiments which incorporate the teachings of the present invention have been shown and described in detail herein, those skilled in the art can readily devise many other varied embodiments that still incorporate these teachings.

What is claimed is:

1. A method of producing a digital bitstream containing an interactive program guide for a digital information distribution system comprising:

combining, in a frame synchronized manner, background imagery with at least one video sequence and at least one graphic containing program guide information to form a composited frame sequence; wherein the combining step further comprises:

compositing, frame-by-frame, at least one video sequence onto said background imagery to form a background sequence; and compositing a plurality of program guide graphics onto said background sequence, where a different program guide graphic is composited onto said background sequence to form a plurality of program guide frame sequences that represent individual program guide pages; and encoding the composited frame sequence to compress information therein to form a digital bitstream.

2. The method of claim 1 wherein said encoding step further comprises:

separately encoding each of said program guide frame sequences to form a digital bitstream for each of the program guide frame sequences.

3. The method of claim 2 further comprising the steps of:

multiplexing each of the digital bitstreams into a common transport stream.

4. The method of claim 3 wherein fifteen program guide sequences are formed, encoded, and contained in a common transport stream.

5. The method of claim 4 further comprising:

encoding an audio signal associated with one of the video sequences; and multiplexing the encoded audio signal into the common transport stream.

6. The method of claim 3 wherein said multiplexing step further comprises the step of:

multiplexing foreground program guide data into said common transport stream.

7. A method of generating and presenting an interactive program guide to a viewer comprising the steps of:

combining, in a frame synchronized manner, digital background imagery with at least one digital video sequence to form a background frame sequence;

combining said background frame sequence with a plurality of program guide graphics containing program guide information, where a different program guide graphic is combined with said background frame sequence to form a plurality of composite frame sequences;

separately encoding each of the plurality of composite frame sequences to compress information therein and form a plurality of digital bitstreams;

multiplexing the digital bitstreams into a transport stream;

transmitting the transport stream through a distribution network to a plurality of subscriber equipment;

extracting from said transport stream one of said digital bitstreams;

decoding said extracted digital bitstream to produce a composite frame sequence; and displaying an interactive program guide containing said background imagery, at least one video sequence, and said program guide graphic from said composite frame sequence.

8. The method of claim 7 further comprising the steps of:

encoding an audio signal associated with said at least one video sequence;

multiplexing said encoded audio signal into said transport stream; and decoding said encoded audio signal within said subscriber equipment.

9. The method of claim 7 further comprising the steps of:

selecting a different digital bitstream to decode;

extracting said different digital bitstream from said transport stream;

decoding said extracted different digital bitstream to produce a different composite frame sequence; and displaying a different interactive program guide containing said background imagery, said at least one video sequence, and a different program guide graphic from said composite frame sequence, where said background imagery and at least one video sequence is displayed in an uninterrupted manner while the different digital bitstream is extracted and decoded.

10. Apparatus for producing a digital bitstream representing an interactive program guide for a digital information distribution system comprising:

a video compositor for compositing background imagery with at least one video frame sequence to form a background frame sequence;

a plurality of program guide compositors for combining a plurality of program guide graphics with said background frame sequence to form a plurality of program guide frame sequences;

a plurality of encoders for separately encoding each of said program guide frame sequences to form a plurality of bitstreams; and a multiplexer for multiplexing said plurality of bitstreams into a transport stream.

11. The apparatus of claim 10 further comprising a program guide graphics generator for producing said program guide graphics and foreground overlay graphics, where said foreground overlay graphics are included into the transport stream as user data.

12. The apparatus of claim 10 further comprising a program guide graphics generator for producing said program guide graphics and foreground overlay graphics, where said foreground overlay graphics are included into the transport stream as private data.

13. The apparatus of claim 10 wherein said encoders are MPEG-2 encoders.

14. An interactive program guide comprising:

a background image;

at least one video sequence positioned upon said background image;

a program guide graphic positioned upon said background;

where the background image, the at least one video sequence and the program guide graphic are frame synchronized.

15. Apparatus for distributing digital information comprising:

service provider equipment;

subscriber equipment; and a communications network coupling the service provider equipment to the subscriber equipment, where said service provider equipment further comprises a program guide generator that produces a digital bitstream containing a program guide graphic and at least one video sequence, where the guide graphic program and said at least one video sequence are frame synchronized; said program guide generator further comprising:

a video compositor for compositing background imagery with at least one video frame sequence to form a background frame sequence;

a plurality of program guide compositors for combining a plurality of program guide graphics with said background frame sequence to form a plurality of program guide frame sequences;

a plurality of encoders for separately encoding each of said program guide frame sequences to form a plurality of bitstreams; and a multiplexer for multiplexing said plurality of bitstreams into a transport stream.

16. The apparatus of claim 15 further comprising a program guide graphics generator for producing said program guide graphics and foreground overlay graphics, where said foreground overlay graphics are included into the transport stream as user data.

17. The apparatus of claim 15 further comprising a program guide graphics generator for producing said program guide graphics and foreground overlay graphics, where said foreground overlay graphics are included into the transport stream as private data.

18. The apparatus of claim 15 wherein said encoders are MPEG-2 encoders.

* * * * *